(12) United States Patent  
Bilcauu et al.

(10) Patent No.: US 7,029,306 B2  
(45) Date of Patent: Apr. 18, 2006

(54) ELECTRICAL CONNECTOR FOR THE SIMULTANEOUS CONNECTION OF TWO SUPERPOSED SMART CARDS

(75) Inventors: Herve Guy Bilcauu, Dole (FR); Laurent Bouvier, Dole (FR); Patrick Daubigney, Authume (FR); Sylvain Rochon, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/100,726

(22) Filed: Apr. 7, 2005

(65) Prior Publication Data

US 2005/0196994 A1  Sep. 8, 2005

Related U.S. Application Data

(63) Continuation-in-part of application No. PCT/EP2003/050670, filed on Sep. 30, 2003.

(30) Foreign Application Priority Data

Oct. 14, 2002  (FR)  .................................... 0212721

(51) Int. Cl.  
*H01R 13/62* (2006.01)

(52) U.S. Cl. ..................................... 439/326

(58) Field of Classification Search ................. 439/326  
See application file for complete search history.

(56) References Cited

U.S. PATENT DOCUMENTS

| 5,877,488 A | 3/1999 | Klatt et al. |
| 6,099,337 A * | 8/2000 | Chan .......................... 439/326 |
| 6,471,550 B1 * | 10/2002 | Maiterth et al. ............ 439/631 |

FOREIGN PATENT DOCUMENTS

| EP | 1 039 406 A2 | 9/2000 |
| EP | 1 204 064 A2 | 5/2002 |
| WO | WO 01/01324 A2 | 1/2001 |
| WO | WO 2004/036483 A1 | 4/2004 |

* cited by examiner

*Primary Examiner*—Ross Gushi  
(74) *Attorney, Agent, or Firm*—Peter Van Winkle

(57) ABSTRACT

A compact smart card connector that can hold and connect to two smart cards (Cs, Ci) includes a base plate (42) that holds base contacts (46) and a cover plate (44) that holds cover contacts (54) and that is pivotally connected to the base plate. An intermediate plate device (36) holds first and second smart cards (Cs, Ci) respectively against its upper and lower surfaces (35, 39) with contact pads (Ps) of the cards facing away from the plate. The intermediate plate lies between the base and cover, so when the cover is pushed down, this pushes the cards against the base and cover contacts. The intermediate plate device has coupling plates (130) with slots that allow the intermediate plate device to slide to lock the cover in its lowered position.

13 Claims, 18 Drawing Sheets

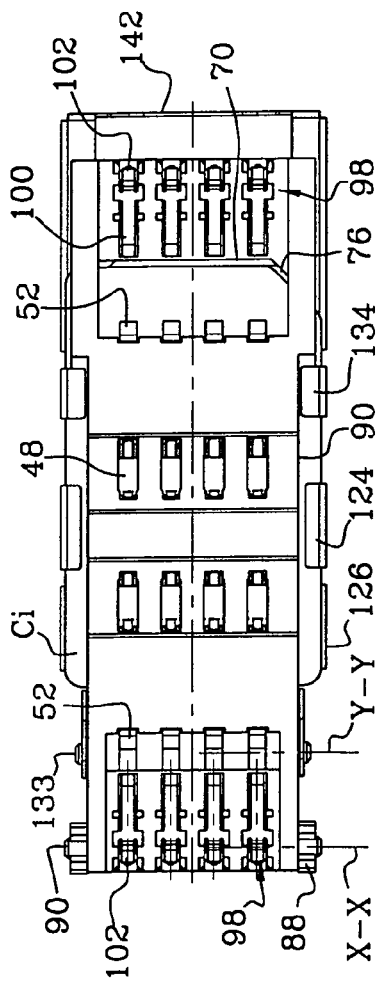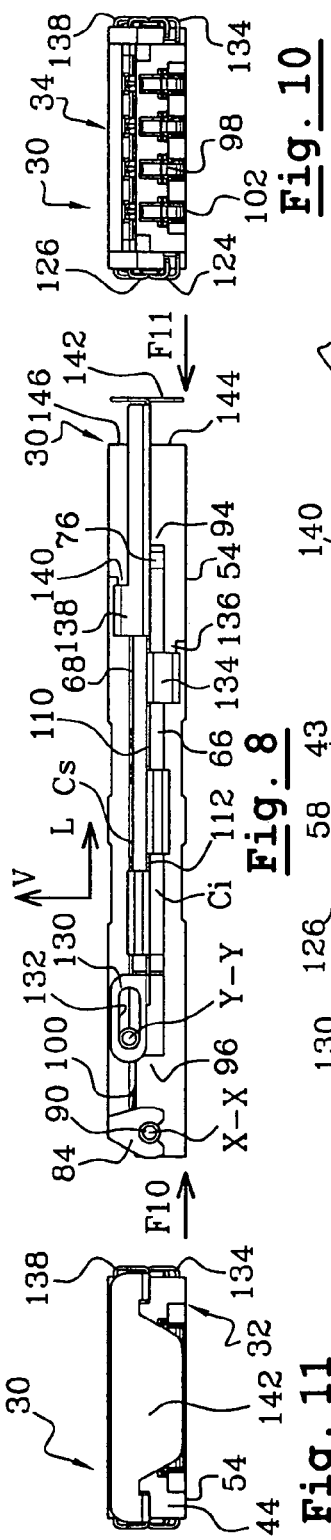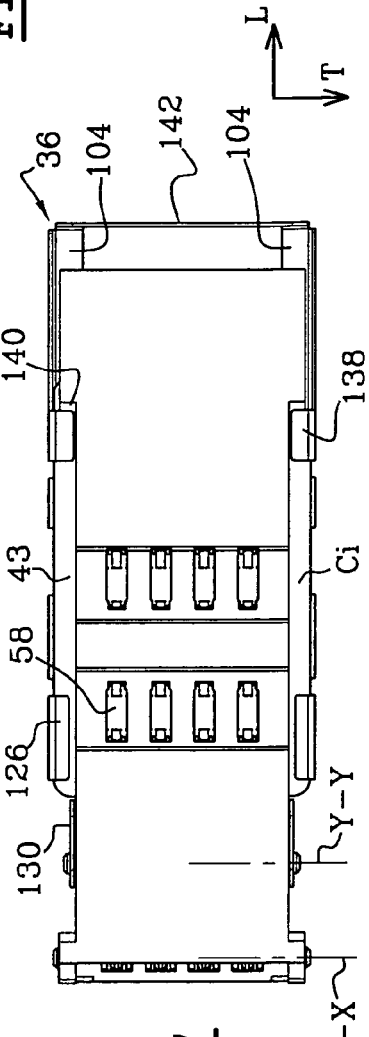

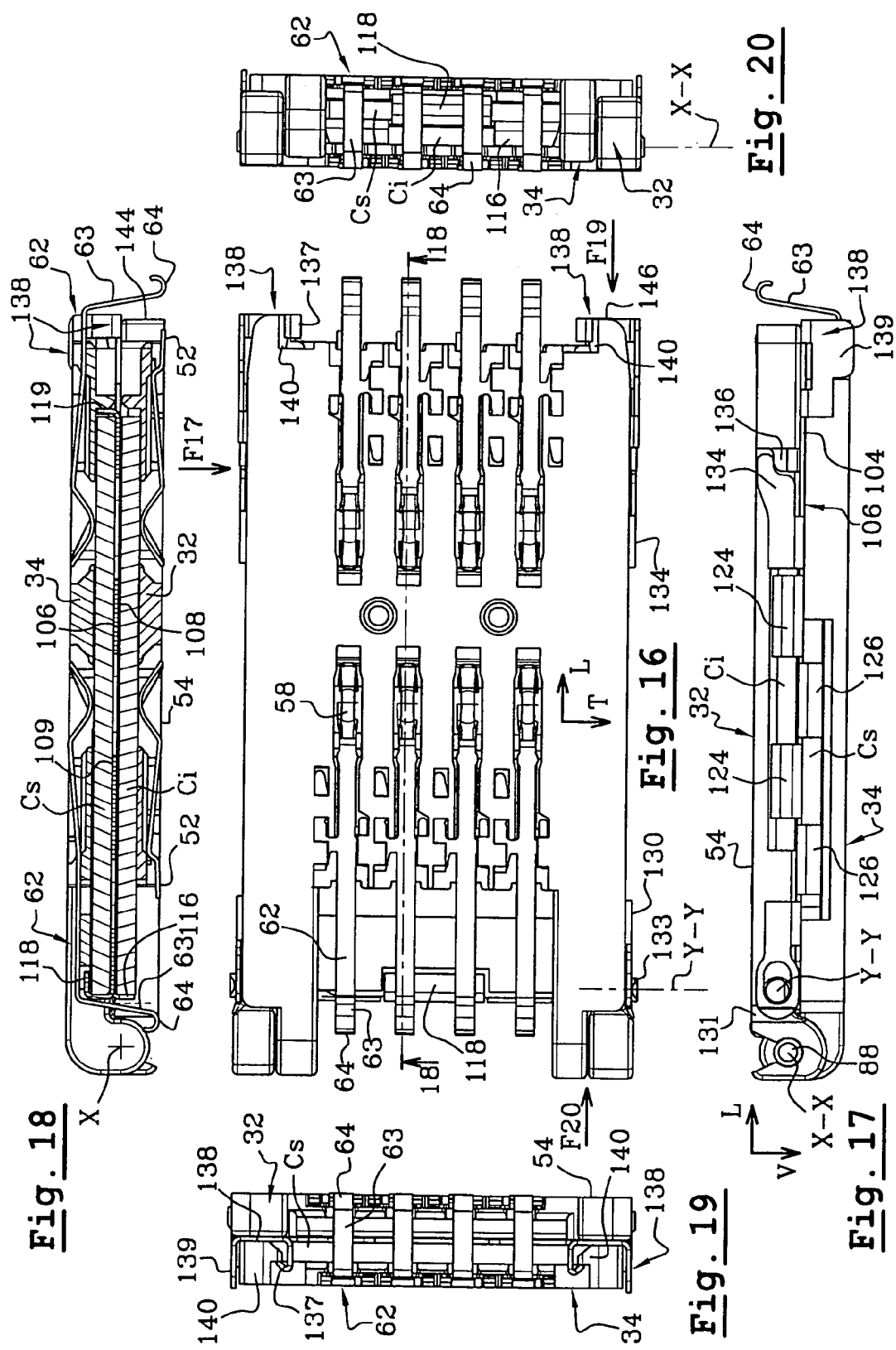

ELECTRICAL CONNECTOR FOR THE SIMULTANEOUS CONNECTION OF TWO SUPERPOSED SMART CARDS

CROSS-REFERENCE

This is a continuation-in-part of PCT application PCT/EP 2003/050670 filed 30 Sep. 2003 which claims priority from French application 0212721 filed 14 Oct. 2002.

BACKGROUND OF THE INVENTION

The present invention relates to a very compact electrical connector for the simultaneous connection of two smart cards. This type of smart card, also called a chip card or electronic memory card, is used in many applications. The simultaneous connection to two of such cards allows the connector to carry out transactions by exchanging data, for example with a banking network. This principle finds many applications for the purpose of facilitating commercial transactions. Shopkeepers making use of this principle must have as many cards as there are banking or payment networks with which they have entered into prior agreements.

For the purpose of greater integration, it has been proposed to make use of a single terminal for processing data and for exchanging data with various banking networks depending on those with which a shopkeeper's customers have an arrangement. The customers insert their cards which identify them and allow the cards to exchange data with these networks. Such terminal capable of simultaneously accommodating several cards must therefore, in principle, have as many electrical connectors for connection as there are cards likely to be used simultaneously.

For the purpose of greater integration, of saving on components and of simplifying the operations of mounting and connecting the connectors, as well as to simplify the installation of the cards into the terminal, connectors have already been proposed for the simultaneous electrical connection of two contact-type smart cards whose main faces comprise contact pads.

Document EP-A2-1,204,064 has proposed a connector for connecting to two SIM (Subscriber Identification Module) or MICROSIM type cards. Such connector has a cover mounted pivotally on a base, the cover forming a housing, or partitioned compartment, in which the two cards Ci, Cs may be inserted, oriented back to back, from an end of the cover. The cover also has in its upper face, contact elements for connection to the upper card.

The above design has numerous drawbacks. First, it culminates in total congestion in terms of height, or thickness, of the connector in the position of use which results from the design of the cover. Moreover, the electrical connection of the contact elements carried by the cover, with complimentary electrical connection elements carried by the base, is unsatisfactory, complex and unreliable. This design makes it necessary in particular to "bring" all the electrical connection elements into the vicinity of one and the same longitudinal end of the connector, thereby culminating in great complexity of the design of the contact elements carried by the cover. Moreover, any change, or installing, of just the upper card requires that the cover be opened in order to access this card and hence that the electrical connection of the lower card be completely interrupted. The space necessary above the connection with a view to the handling of the cards is considerable.

Document WO-A1-01/01324 describes and represents a connector for the electrical connection of two smart cards, respectively lower and upper, each of which comprises contact pads which lie in a main face of the card opposite a back of the card, of the type comprising a lower base in the form of a plate made of insulating material and forming a support for a first series of electrical contact elements able to cooperate with the contact pads of the lower card, of the type comprising an upper cover in the form of a plate made of insulating material and forming a support for a second series of electrical contact elements able to cooperate with the contact pads of the upper cards, and which is mounted pivotally with respect to the base, about a transverse geometrical axis of pivoting (X—X) located in the vicinity of the rear longitudinal ends facing the base and the cover, between an open position and a closed position of contact in which the cover is substantially parallel to the base and in which the contact pads of each cards present in the connect cooperate with the associated contact elements, and of the type comprising and intermediate plate which is mounted articulated with respect to the base, about a transverse geometrical axis of articulation (Y—Y) located in the vicinity of the rear longitudinal ends facing the base and the cover, whose two opposite faces, lower and upper, run facing the backs of the lower and upper cards respectively.

SUMMARY OF THE INVENTION

In accordance with one embodiment of the invention, a connector is provided with a base for contact with a lower smart card, with a cover pivotally connected to the base for contact with an upper smart card, and with an intermediate plate which is pivotal with respect to the base and cover and which lies between the opposed backs of the cards. The cover is pivotally mounted on the base, and the intermediate plate is preferably pivotally mounted on the cover. Two cards can be mounted on the intermediate plate one against the bottom face and the other against the top face, so contact pads on the cards engage contacts on the base and cover.

According to other characteristics of the invention:

for the electrical connection of the two smart cards, respectively lower and upper, each of which comprises contact pads which run in a main face of the card opposite a back of the card, the connector comprises:

a lower base in the form of a plate made of insulating material and forming a support for a first series of electrical contact elements able to cooperate with the contact pads of the lower card, an upper cover in the form of a plate made of insulating material and forming a support for a second series of electrical contact elements able to cooperate with the contact pads of the upper card, and which is mounted pivotally with respect to the base, about a transverse geometrical axis of pivoting located in the vicinity o the rear longitudinal ends facing the base and the cover, between an open position and a closed position of contact in which the cover is substantially parallel to the base and in which the contact pads of each card present in the connector cooperate with the associated contact elements.

and an intermediate plate which is mounted articulate with respect to the base, about a transverse geometrical axis of articulation located in the vicinity of the rear longitudinal ends facing the base and the cover, and whose two opposite faces, lower and upper, run facing the backs of the lower and upper cards respectively;

the articulation axis being offset longitudinally forwards with respect to the axis of pivoting of the cover on the base;

the connector comprises means of direct or indirect locking of the cover in the closed position on the base, which comprise a movable locking element which is mounted so as to slide longitudinally with respect to the base between an extreme locked position and an extreme unlocked position;

the connector comprises first means of angular locking of the intermediate plate with respect to the base, and second means of angular locking of the cover with respect to the intermediate plate;

the intermediate plate is the movable locking element common to the first and second locking means;

the intermediate plate is mounted so as to slide longitudinally, with respect to the item on which it is mounted articulated, between an extreme locked position and an extreme unlocked position, so as to angularly lock the cover with respect to the intermediate plate, in a closed position of contact of the contact pads of the lower card with the associated contact elements of the first series;

the intermediate plate is mounted so as to slide longitudinally, with respect to the item on which it is mounted articulated, between an extreme locked position and an extreme unlocked position, so as to angularly lock the cover with respect to the intermediate plate, in a closed position of contact of the contact pads of the upper card with the associated contact elements of the second series;

the second locking means comprise elastically deformable locking tabs which comes into play between the cover and the intermediate plate;

the movable locking element is mounted so as to slide between a front extreme locked position and a rear extreme unlocked position;

the means of articulation of the intermediate plate on the base, or the cover, comprise two articulation pin spans, which run transversely outwards each from one of the two longitudinal parallel faces of the base, or of the cover, and comprise two longitudinal ports each of which is formed at the rear free end of the intermediate plate and receives and articulation pin span;

the means of articulation of the cover on the base consist of two articulation pin spans which run transversely outwards each from one of the two longitudinal parallel faces of the base or of the cover, and of two complementary cylindrical housings each of which is formed at the rear free end of one of two lateral uprights of the cover or of the base respectively;

each of the two opposite faces, lower and upper, of the central body of the card-carrying intermediate plate constitutes a platform on which the corresponding card rests;

the intermediate plate is a card(s)-carrying plate which comprises means for guiding, positioning and retaining at least one of the two cards which, together with the platform on which the card rests, delimit a compartment in which this card is installed globally longitudinally from front to rear;

the card-carrying intermediate plate delimits a housing on each of its faces in such a way as to be able to simultaneously carry a card on each of its two opposite faces, lower and upper, the cards being oriented back to back;

each contact element of the second series comprises a free longitudinal contact end which projects beyond the lower face of the cover so as to cooperate with a contact pad of the upper card, and a connection tab which, in the closed position of the cover, is able to cooperate with a conducting connection zone which is fixed with respect to the base;

the connection zone belongs to an electrical connection blade carried by the lower base;

each electrical connection blade comprises a free longitudinal connection end which projects beyond the upper face of the base so as to cooperate with the connection tab of the associated contact blade, and a connection tab which is able to cooperate with a conducting track arranged in the upper face of a printed circuit board on which the base of the connector is fixed;

the connection zone is a conducting track arranged in the upper face of a printed circuit board on which the base of the connector is fixed;

the second series of contact elements comprises several pairs of contact elements each pair comprising two aligned elements, rear and front, whose contact ends are adjacent in the vicinity of the center of the plate made of insulating material and whose connection tabs are arranged in the vicinity of the respectively rear and front longitudinal ends of the insulating material plate;

the two cards are of globally rectangular shape, and the transverse axes of pivoting and of articulation are orthogonal to the parallel edges of large length of the cards;

the two cards are of globally rectangular shape, and the transverse axes of pivoting and of articulation are parallel to the parallel edges of large length of the cards.

Other characteristics and advantages of the invention will become apparent from reading the detailed description which follows for the understanding of which reference will be made to the appended drawings.

BRIEF DESCRIPTION OF THE DRAWINGS

FIG. 7 is a plan view from above of the connector represented in FIG. 8;

FIG. 8 is a side view of the connector of FIG. 7;

FIG. 9 is a view from below of the connector of FIG. 7;

FIG. 10 is a view along the arrow F10 of FIG. 8;

FIG. 11 is an end-on view along the arrow F11 of FIG. 8;

FIG. 16 is a view from above of the connector of FIG. 15;

FIG. 17 is a side view along the arrow F17 of FIG. 16;

FIG. 18 is a sectional view along the line 18—18 of FIG. 16;

FIG. 19 is a side view along the arrow F19 of FIG. 16;

FIG. 20 is a side view along the arrow F20 of FIG. 16;

DESCRIPTION OF THE PREFERRED EMBODIMENTS

1. Limited Description of the Invention

Figure 1:
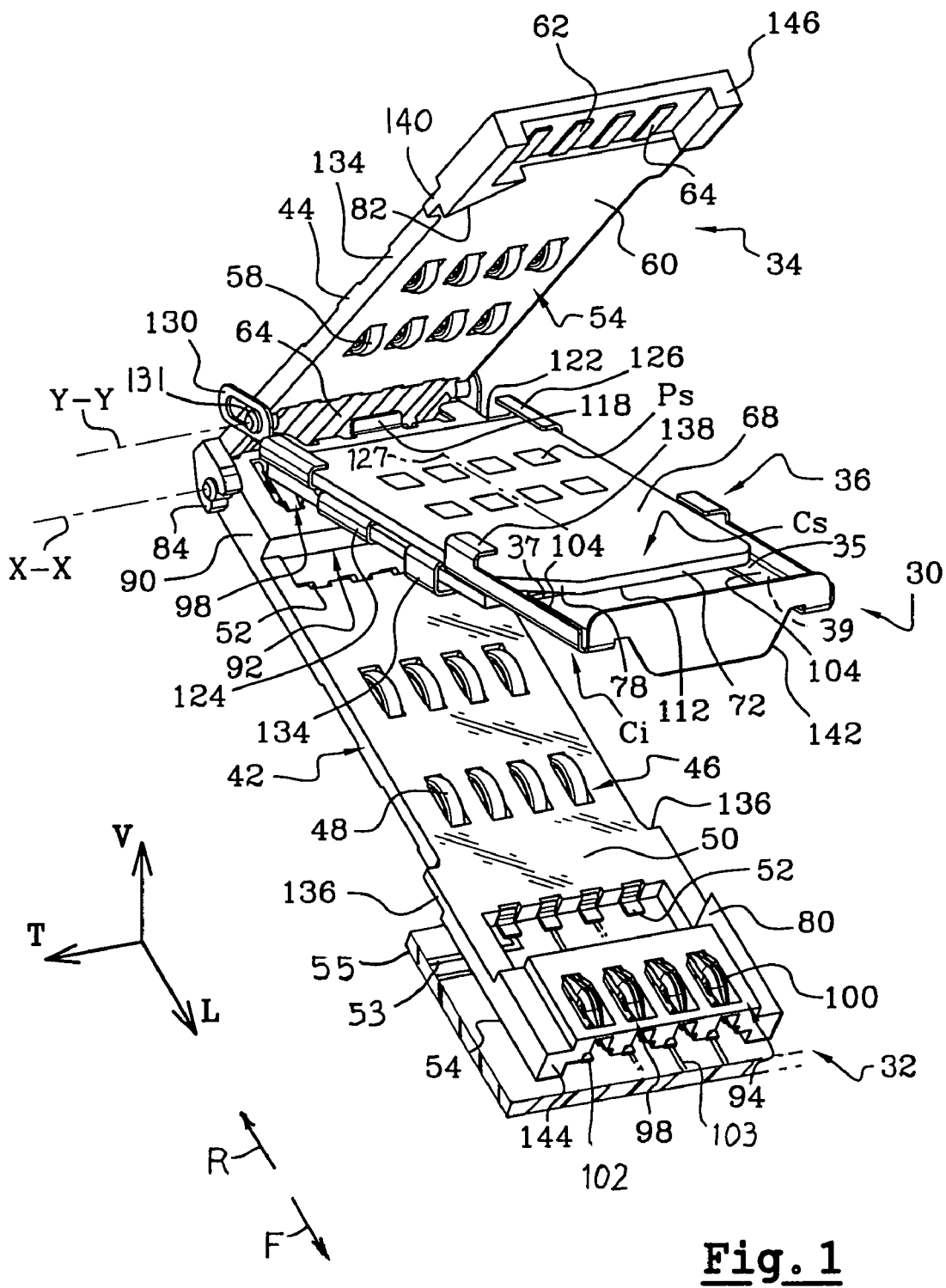
FIG. 1 is an isometric view of a first embodiment of a connector according to the present invention which is represented in the open position with two cards in position on the card-carrying intermediate plate.
Figure 2:
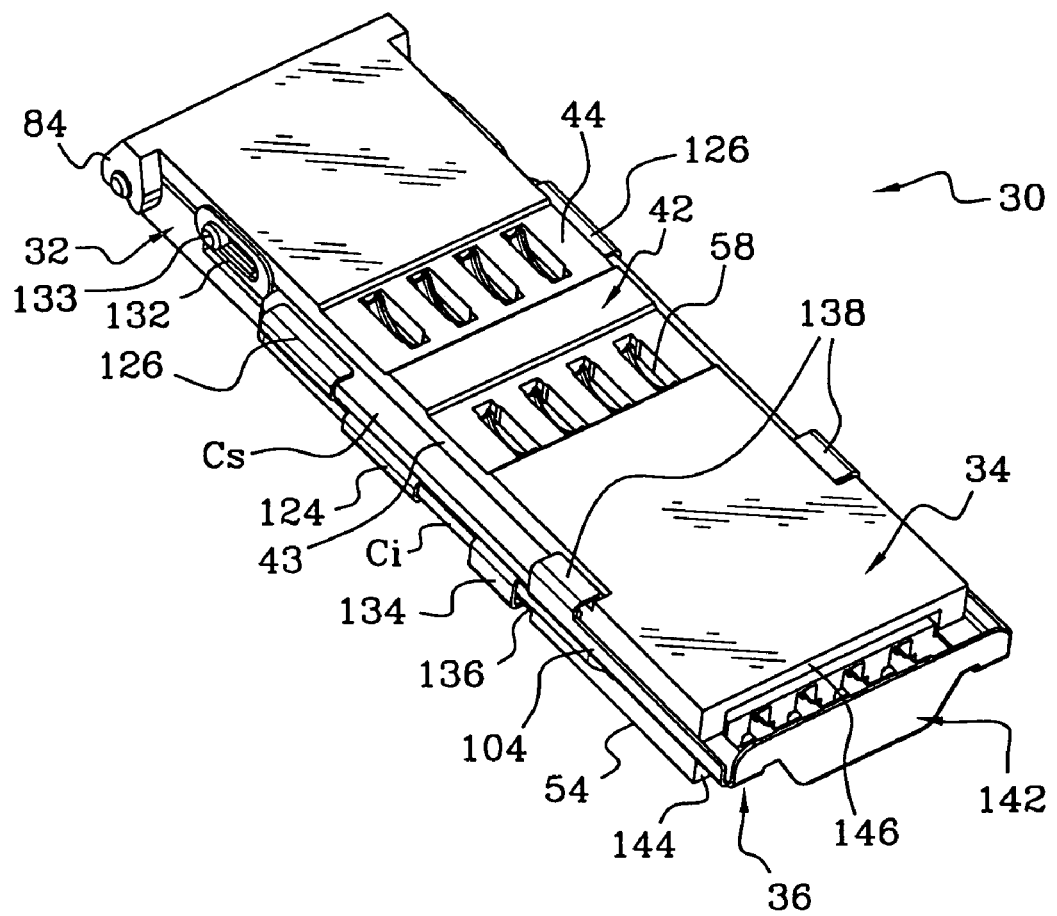
FIG. 2 is an isometric view from another angle, of the connector of FIG. 1 which is represented in the closed and locked position of the cover.

FIG. 1 illustrates a smart card connector 30 that can simultaneously connect to two smart cards. The connector includes a base 32 with an insulative base plate 42 and a cover 34 with an insulative cover plate 44. The cover plate lies above the base and is pivotally connected to the base about a first transverse (T) axis X—X. The connector also includes an intermediate plate device 36 that lies between the base and cover and that is at least pivotally connected to them. In the particular connector shown, the intermediate plate device is connected to the cover about a transverse axis Y—Y that is spaced from the first axis X—X, to help minimize the overall height of the connector. The base has contact blades 46 with contact ends 48 that project above a largely planar upper surface 50 of the base plate, while the cover has contact blades 54 with contact ends 58 that project below a largely planar lower surface 60 of the cover plate.

The smart cards Cs and Ci, which are both of the MICROSIM type, are both mounted on an intermediate plate 37 of the intermediate plate device 36. One card Cs lies against an upper face 35 of the intermediate plate with the card contact pads Ps facing upward, so the card pads can engage the cover contact ends 58 when the connector is closed. The other card Ci lies against a lower face 39 of the intermediate plate with the card contact pads facing downward, so the card pads can engage the base contact ends 48 when the connector is closed. The connector is closed by pushing down the cover so the intermediate plate and cards thereon are closely sandwiched between the cover and base.

The cards have cantered polarizing corners such as 78, and the base and cover have polarizing parts 80, 82, to prevent the cover from fully closing unless the cards have been inserted in the proper orientations.

The intermediate plate device 36 is slidable in forward F and rearward R longitudinal L directions on the cover, and therefore on the base. The intermediate plate device has a rear end with a pair of pivotable and sliding coupling plates 130 that each has a hole. Each hole is a slot that is elongated in the longitudinal directions L, to let the intermediate plate slide a limited distance in front and rear directions. The cover has a pair of trunnions 131 with grooves that each fits into one of the slots.

When the cover has been pushed down to its lowered position (with the contact ends deflected), the intermediate plate device can lock all plates close together. To lock the plates together after they have been pushed down, the lowered intermediate plate device is moved forward F. Upper locking tabs 138 of the intermediate plate device have upper ends that move above lugs 140 on the cover. Also, lower locking tabs 134 of the intermediate plate device have lower ends that move below lugs 136 on the base. This locks all three plates together, so the contact ends 48 and 58 of contact blades on the base and cover engage contact pads on the two cards. The intermediate plate device has a handle 142 at its front end that can be manually moved forward F to lock the connector closed (after the cover has been pushed down), and that can be moved rearward R to open the connector. Resilience of the contact blade ends 48, 58 causes the cover and intermediate plate to both move up a limited amount when the connector is unlocked.

Each lower or base contact blade 46 has a tail 52 that is at the same level as the bottom of the base, so each contact tail can be soldered to a conductive track 53 of a circuit board 55 as by reflow soldering. It can be more difficult to connect the upper or cover contact blades to traces on the circuit board.

To connect the upper contact blades to traces on the circuit board, applicant connects the upper contact blades to special contacts on the base. Each upper or cover contact blade 54 has a free connection end 62 (FIG. 3) with a downward-facing flat surface. Applicant forms the base front with a row of connection blades 98 (FIG. 1) with upwardly projecting ends 100 that are positioned to engage the upper contact blade free connection ends 62 when the cover is fully closed on the base. The connection blades 98 have tails 102 that are soldered to traces 103 on the circuit board. Another row of connection blades 98 is provided at the rear end of the base, that engage upper contact free connection ends 64 of the rearmost upper contact blades. The base is provided with thickened front and rear ends so the connection ends 100 of the connection blades lie at heights to readily engage the upper contact blade free connection ends 62. The height of the base is lower at the middle where the cards lie on the intermediate plate device.

The intermediate plate device 36 is formed of a single piece of sheet metal that forms the intermediate plate which the cards lie against. The sheet metal has bent tabs such as 126 that each has a part that extends vertically upward and a top that is bent inward, toward an imaginary line 127 that extends longitudinally halfway between opposite side of the plate. The front of the sheet metal forms the handle 142, and the rear forms the coupling plates 130. There is an open space immediately forward and rearward of the cards, so the connection contact ends 100 can project though this space.

It is possible to install or remove one card such as the upper card Cs while the connector continues to be connected to the lower card Ci. This can be done by holding down the intermediate plate device 36 by pressing down the handle 142 and lifting the cover 34 (after releasing the cover to pivot up).

Although terms such as upper, lower, etc. are used to describe the connector as it is illustrated, the connector can be used in any orientation.

2. Detailed Description of the Invention

In the description which follows, identical, analogous, or similar components will be designated by the same reference numerals. Without limitation, and with a view to facilitating the understanding of the description and of the claims, the terms "vertical", "horizontal", "lower", "upper", "longitudinal", "transverse" will be used with reference to the trihedron LTV represented in the figures.

The connector 30 according to the invention consists in essence of a lower base 32 forming a contact carrier, and upper cover 34 forming a contact carrier which is mounted pivotally on the base 32, and of an intermediate plate 36 which here carries two smart cards of the MICROSIM card type, including an upper card Cs and a lower card Ci.

In this embodiment, in accordance with an aspect of the invention, the intermediate plate 36 is mounted articulated on the upper cover 34.

The central part of the base 32 or cover 34, is devised according to a known general design of a connector for the connection of a smart card, such as for example described and represented in documents WO-A-98/52137, WO-A-01/08266 or WO-A-98/52138 from the applicant, and each is made in the form of a rectangular plate of insulating material 42, 44.

The plate 42 of the base 32 constitutes the support of a first series of electrical contact blades 46, here eight in number, arranged in the form of four pairs of longitudinally aligned opposite blades.

Each contact blade 46 comprises an elastically deformable longitudinal contact end 48 which projects vertically upwards above the upper face 50 of the plate 42 of insulating material, and an opposite longitudinal end 62 which, in a known manner, constitutes a tab for the electrical connection of the corresponding blade 46 which runs substantially at the level of the lower face 54 of the lower pate 42, for example so as to be reflow-soldered to an associated conducting track formed on the upper face of a printed circuit board (not represented) on which the connector 30 is fixed.

In the same manner, the plate 44 of insulating material of the cover 34 carries a second series of eight contact blades 54 each of which comprises an elastically deformable free contact end 58 which projects vertically downwards beyond the lower face 60 of the upper plate 44, and which is oriented in the direction of the upper face 50 of the base 32.

Each contact blade 54 also comprises a free electrical connection end 62 which, in this first embodiment, is substantially plane and coplanar with the general plane of the cover 34 and comprises a plane lower electrical connection face 64 which is horizontal and vertically downwards in the direction of the base 32.

The contact ends 48 of the blades 46 of the base 32 are provided so as to cooperate with corresponding contact pads Pi arranged in the main face 66 (FIG. 3) of the downwardly oriented lower card Ci, whereas the free contact ends 58 of the blades 54 of the cover 34 are provided so as to cooperate with the pads Ps arranged in the main face 68, here oriented upwards, of the upper card Cs.

In a known manner, in its transverse edge 70, 72 which here is located at the front of the connector, each card Ci, Cs comprises an inclined or canted corner 76, 78 oriented at 45° which constitutes a means of biasing the orientation of the card.

The biasing means for each card Ci, Cs are supplemented with a supplementary polarizing or biasing finger 80, 82 oriented at 45° and formed in relief above the upper face 50, respectively lower face 60.

The shaping of the two compartments, lower 38 and upper 40, of the intermediate plate 36 which each receive a card Ci, Cs and which are separated by the intermediate partition constituted by the intermediate plate 36, is such that it obliges the cards to be inserted or extracted longitudinally parallel to the plane of the partition.

According to a known general design, for the pivotable mounting of the cover-34 on the base 32, the cover 32 comprises, at its rear longitudinal end (on the left when considering FIG. 8), two transversely opposite lateral uprights 84 each of which comprises an open semicylindrical housing 86 which receives, by elastic snap-fitting, an articulation pivot 88 consisting of a cylinder span 88 which runs along the X—X axis, transversely outwards from the longitudinal lateral face 90 of the plate 42 of the base 32.

According to a characteristic of the invention, for the electrical connection of the upper electrical connector consisting of the cover 34 with its contact blades 54, through the tabs 62, 64, the insulating body or support 52 of the base 32 is extended longitudinally rearwards and frontwards by a rear span or block 92 on the one hand and by a front block 94 on the other hand.

Each block 92, 94 is formed as a thickening with respect to the upper face 50 and each of the blocks of insulating material carries a series of four parallel electrical connection blades 98.

Each electrical connection blade 98 is of similar design to that of contact blades of the "cantilever" type used in the field of connectors for chip cards.

Thus, each electrical connection blade 98 comprises an elastically deformable upper free electrical connection end 100 which runs projecting above the upper horizontal face of the block 94, 96 which carries it and which runs facing a connection tab 62, 64 of the cover 34 in such a way as to be in contact with this tab when the cover 34 is in the closed horizontal position locked on the base 32.

Figure 4:
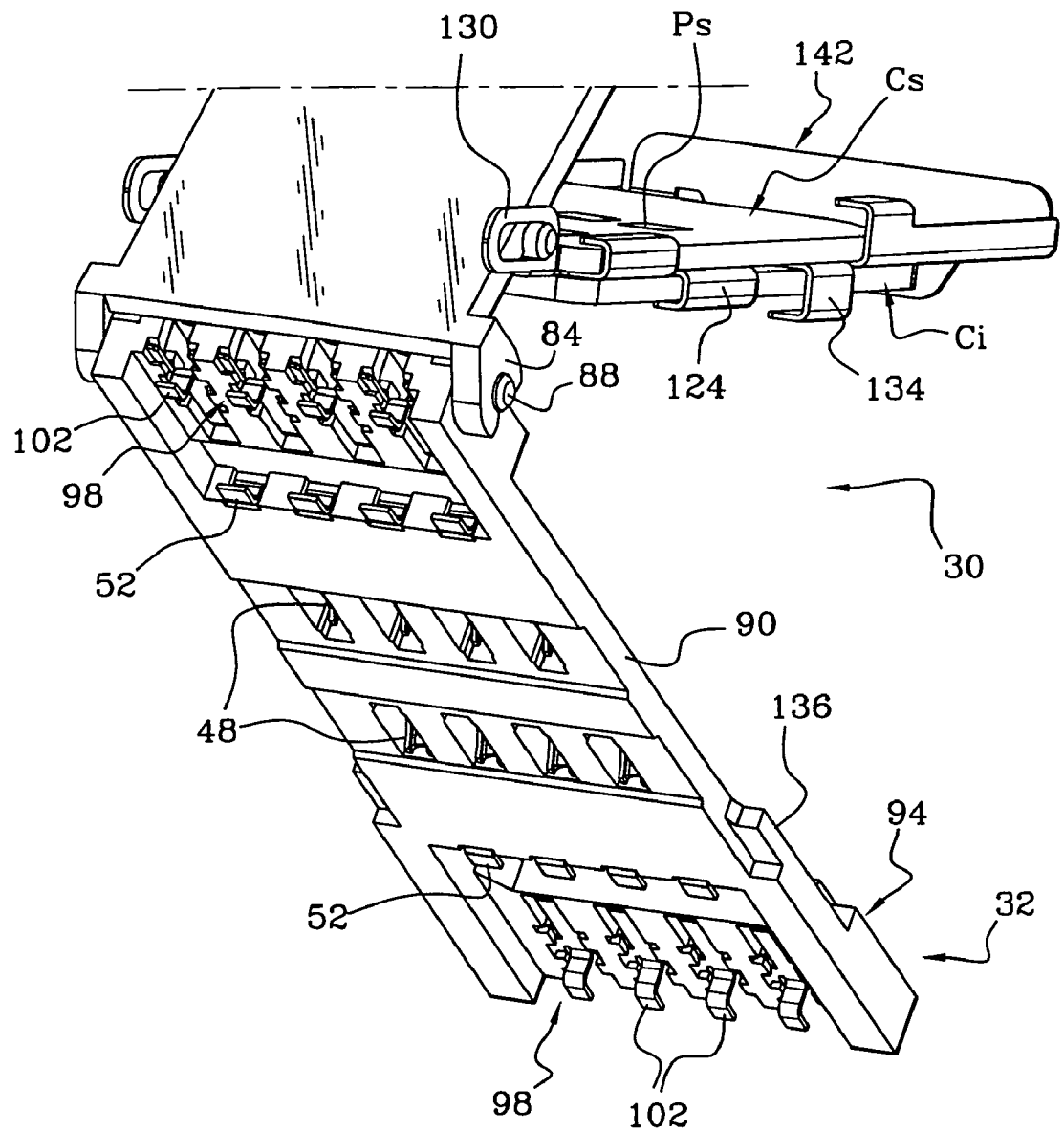
FIG. 4 is an isometric view from below of the connector of FIG. 1
Figure 5:
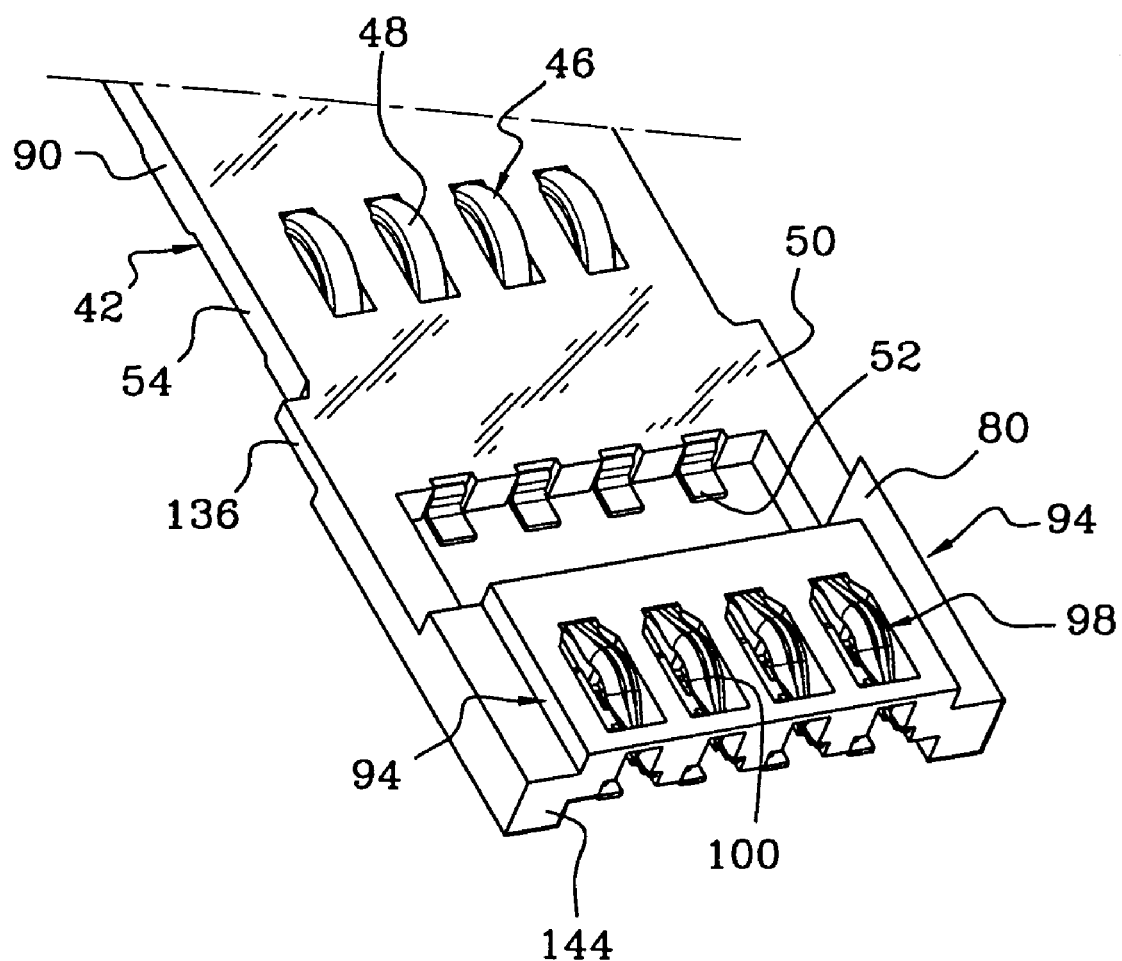
FIG. 5 is an isometric detail view on a larger scale from above of the front longitudinal end of the lower base.
Figure 6:
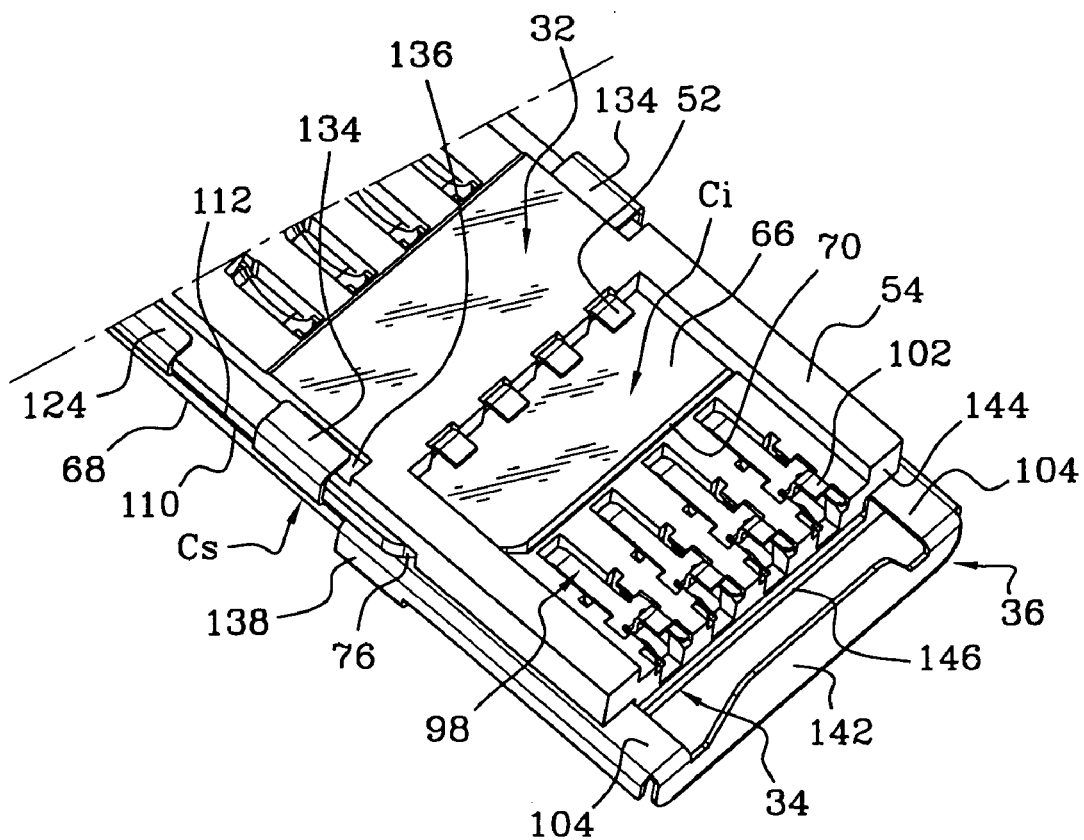
FIG. 6 is an isometric view from below of the front part of the connector represented in FIG. 2

Each connection blade 98 of the base 32 also comprises an electrical connection tab 102 (FIG. 4) which runs substantially in the plane of the lower horizontal face 54 of the base 32 in such a way as to be able to be reflow-soldered to an associated conducting track of the printed circuit board on which the connector 30 is fixed.

Thus, according to this embodiment, the connection tabs 62 of the contact blades 54 of the cover 34 are connected indirectly to the conducting tracks of the printed circuit board, by way of the connection blades 98 carried by the plate 42 of the base 32.

As may be seen in the figures, the thickening of the block 92, 94 with respect to the face 50 is substantially equal to the thickness of the lower card Ci whereas, in the same manner, the thickening of the block forming the biasing (polarizing) finger 82, beyond the lower face 60, is also substantially equal to the thickness of the upper card Cs.

As will be explained hereinbelow, in so far as the central zone of the intermediate plate 36 which runs between the opposite backs, upper 110 (FIG. 8) of the lower card Ci and the lower 112 of the upper card Cs, is of extremely small thickness, in the closed and locked position of the connector such as it is illustrated for example in FIG. 8, the total height of the connector 30 is particularly small, here equal to substantially 4.5 mm. This thickness corresponds in fact substantially to the sum of the average height of the two "individual" connectors constituted by plates 42 and 44 and of the thickness of the two cards.

The constitution of the card-carrying intermediate plate 36 which also constitutes, in accordance with one aspect of the invention, a part of means of locking in the closed position of the cover 34 on the base 32 will now be described in detail.

The intermediate plate 36 is embodied in the form of an item made of blanked and bent sheet metal.

Figure 12:
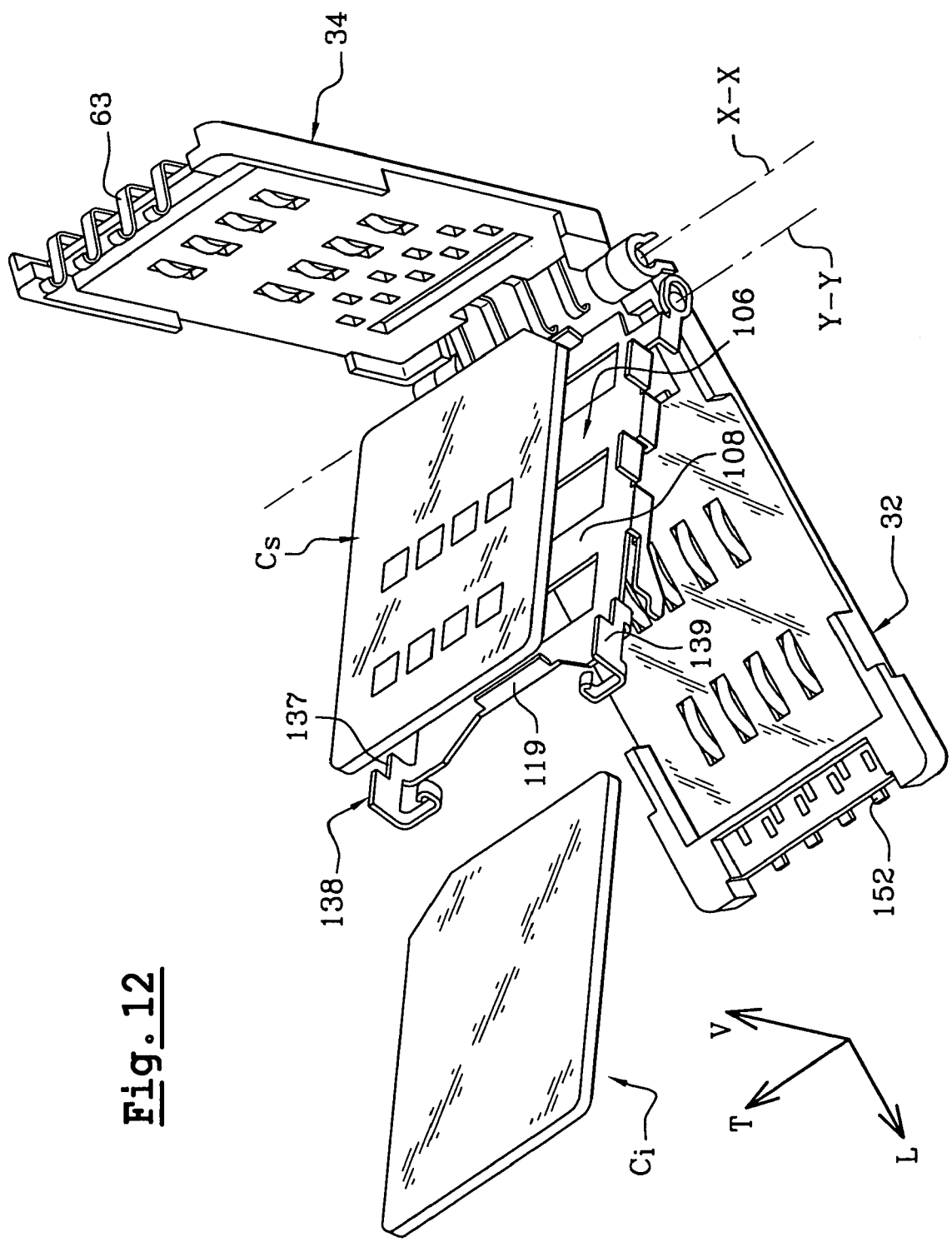
FIG. 12 is an isometric view of a second embodiment of a connector according to the present invention which is represented in the open position with the two cards undergoing installation on the intermediate plate.
Figure 13:
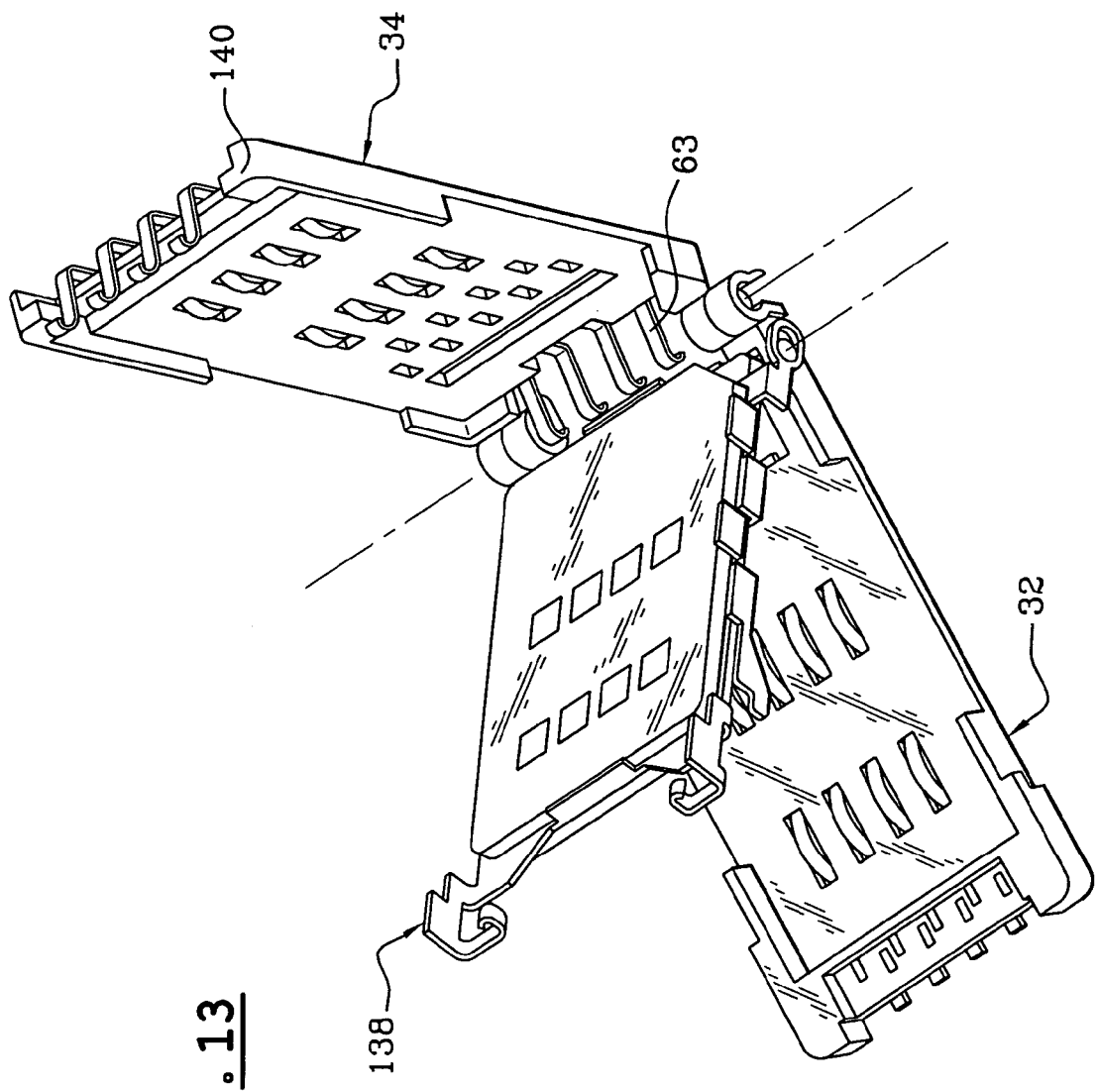
FIG. 13 is a view similar to the previous one in which the two cards are illustrated in position on the intermediate plate.

The intermediate plate 36 takes the form of a recessed rectangular plate consisting in essence of two parallel longitudinal uprights 104 which run in the general midplane of the plate 36 and which are joined by one or more central cross-members 106 (FIG. 12) forming a partition which separates the two, lower and upper, compartments which receive the cards.

This design with two distinct compartments separated by a partition makes it possible to use the connector with either one or two cards in contradistinction to prior art solutions in which the two cards are adjacent back to back and received in a single compartment.

Thus, the plate 36 with its uprights 104 and its cross-members 106 delimits a lower face 108 and an upper face 109 against each of which the corresponding back 110 of the lower card Ci and 112 of the upper card Cs respectively bear when the corresponding card is in place.

For the rearward longitudinal positioning of the lower card Ci and upper card Cs, the intermediate plate 106 here comprises two lower transverse tabs 116 and an upper transverse tab 118 against which bear the rear transverse edge 120 of the lower card Ci and the rear transverse edge 122 of the upper card Cs, respectively.

In such a way as to guide each card Ci, Cs during its longitudinal insertion into the corresponding compartment of the intermediate plate 36, and in order to retain each card substantially bearing against the opposing face of the central portion of the intermediate plate 36, the latter comprises, along its longitudinal uprights 104, a pair of lower tabs 124 which run vertically downwards and which are thereafter folded transversely inwards so as to each delimit a channel or runner which receives a corresponding longitudinal edge of the lower card Ci.

In the same manner, the uprights 104 each comprise an upper guidance and retention tab 126, which is longitudinally offset towards the rear with respect to the lower tab 124 and each of which is also shaped as a channel to receive a corresponding longitudinal edge of the upper card Cs.

The intermediate plate 36 is a component of the means for locking the connector in the closed position.

For this purpose, the intermediate plate 36 is mounted slidably along a direction parallel to its general plane, and longitudinally from the front to the rear or from the rear to the front, with respect to the cover 34 on which it is mounted articulated.

The plate is therefore thus mounted slidably, indirectly, with respect to the base 32 when the cover. 34 and the intermediate plate 36 are lowered into a substantially horizontal position above the base 32, and it constitutes a sliding look locking the cover 34 in the closed position on the base 32.

For this purpose, beyond its rear longitudinal end, the plate 36 comprises two transversely opposite lateral and vertical uprights 130 which run downwards and each of which comprises a port 132 of longitudinal and straight orientation parallel to the plane of the intermediate plate 36.

Each port 132 receives a cylindrical span forming an articulation pivot 133 made integral by molding with the plate 44 of the cover 34 and which runs transversely outwards from a longitudinal lateral face 43 of the plate.

Thus, via its uprights 130 comprising ports 132, the intermediate plate 36 is on one hand mounted articulated with respect to the plate 44 of the cover 34, about the articulation axis Y—Y, and is on the other hand mounted slidably with respect to the plate 44.

Figure 3:
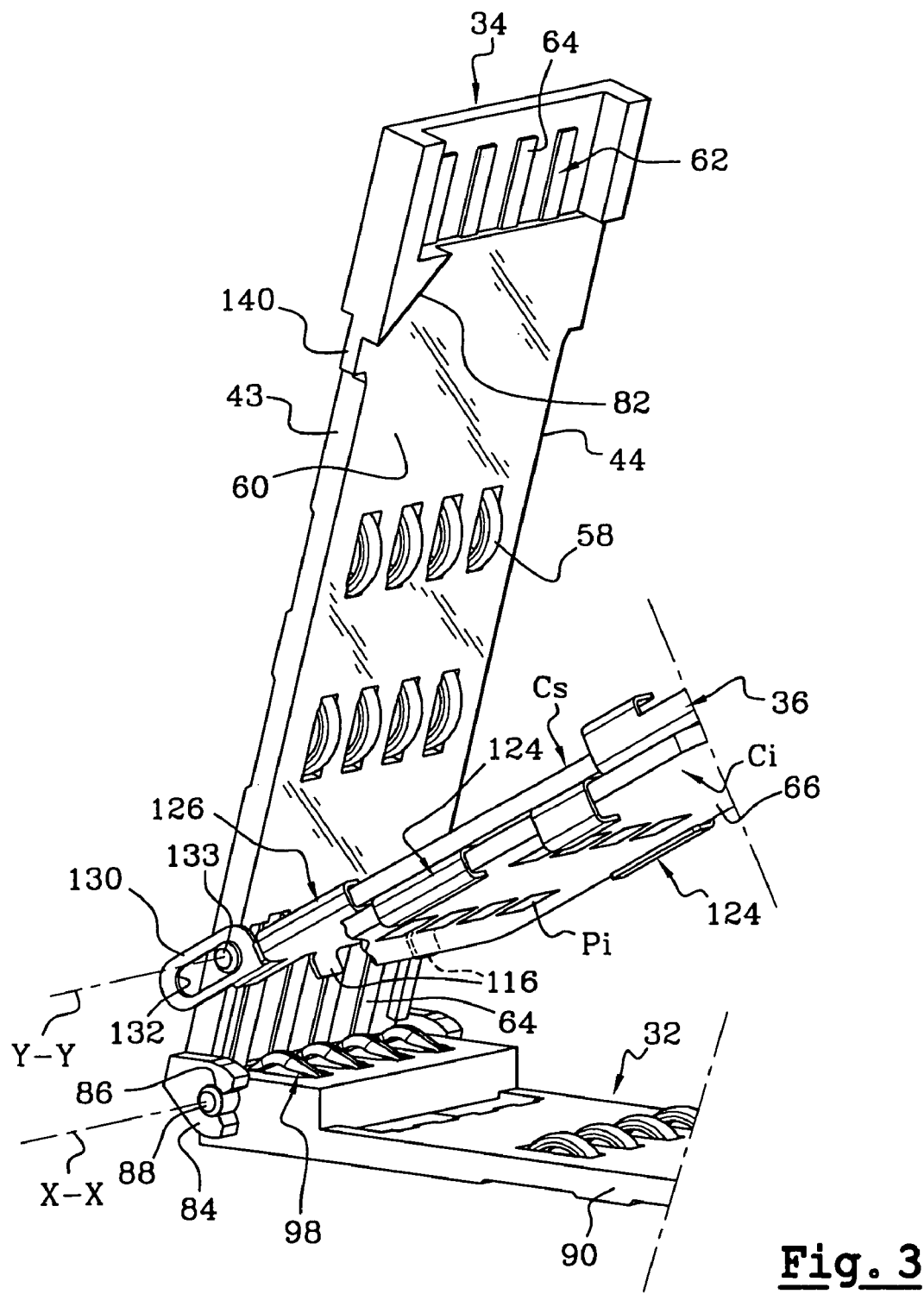
FIG. 3 is a detail view on a larger scale and from another viewing angle of the means of articulation of the card-carrying intermediate plate on the cover and of the cover on the base.

In accordance with an aspect of the invention, and as may be seen in particular in FIG. 3, the pivots 133 aligned along the Y—Y axis are longitudinally offset towards the front with respect to the housing 86 which determine the position of the pivoting axis X—X so as to obtain an assembly of reduced height and congestion.

Towards the front end of the intermediate plate 36, each upright 104 comprises a lower tab 134 for locking the intermediate plate 36 on the base 32 and upper tab 138 for locking the intermediate plate 36 on the cover 34.

The locking tabs 134, 138 run vertically and are thereafter folded transversely inwards so as to be shaped as locking channels or runners.

The height of each channel, the length of the locking tabs 134, 138 and their longitudinal position along the uprights 104, as well as the maximum longitudinal travel of the intermediate plate 36 between its two extreme positions front locked and rear unlocked, are such that, in the extreme front locked position, they run longitudinally frontwards to constitute locking channels in which are received corresponding lugs 136 out of the base 32 and 140 of the cover 34 which project transversely outwards from the longitudinal lateral faces 90 of the base 32 and 43 of the cover 34 respectively which, in the closed position, are received between the opposite, interior longitudinal parallel edges of the facing ends of the looking tabs 134, 138.

To facilitate the locking or unlocking operation, the intermediate plate 36 comprises, at its front longitudinal end, an operating handle 142 which takes the form of a vertical and transverse plate formed at the end of the uprights 104 which extend beyond the transverse front end faces 144, 146 of the base 32 and of the cover 34 as may be seen in FIG. 8, of a length substantially equal to the locking or unlocking travel.

The design according to the invention just described makes it possible to use the connector with one or both cards.

The design of the intermediate plate 36 allows correct positioning of the cards before the closure of the connector.

If the cards Ci or Cs are present, the elasticity of the contact blades, as well as those of the connection blades 98 cause partial opening of the connector after its unlocking.

The design of the means of articulation of the cover 34 on the base 32 allows the demounting by elastic snap removal of the cover 34, in particular with a view to the demounting of the base 32.

The connector 30 can be closed and locked even in the absence of a card.

This is the case in particular when it is delivered for its mounting by soldering for which operation it takes the form of a single component all of whose "outputs" to be connected are of a conventional design for the implementation according to SMC (Surface Mounting Components) technologies for electrical or electronic components.

Without departing from the framework of the invention, the intermediate plane can, by way of variant, be made of a molded plastic, but this results in a light increase in the total thickness of the connector.

Additionally, all of the teachings of the invention may be carried over to a connector in which the axes X—X and Y—Y are parallel to the large sides of the cards.

Likewise, the cards are not necessarily of the SIM of MICROSIM type, but may for example be of the "MMC", or "MEMORYSTICK" type with aligned contact pads which run in a main face of the card and at a longitudinal end of the latter.

The second embodiment of a connector in accordance with the teachings of the invention will now described, essentially by comparison with the design according to the first embodiment.

The biasing (polarizing) fingers 80 and 82 are formed in the vicinity of the rear longitudinal ends of the base 32 and of the cover 34 and the cards are thus mounted in a reverse position with respect to that described previously.

For the pivoting mounting of the cover 34 on the base 32, the arrangement of the pivots 88 and of the housings 86 is reversed and, when the connector 30 is soldered to a printed circuit board, the pivots 88 built into the cover 34 are imprisoned in the housings of the uprights 84 which are built into the base 32.

Figure 14:
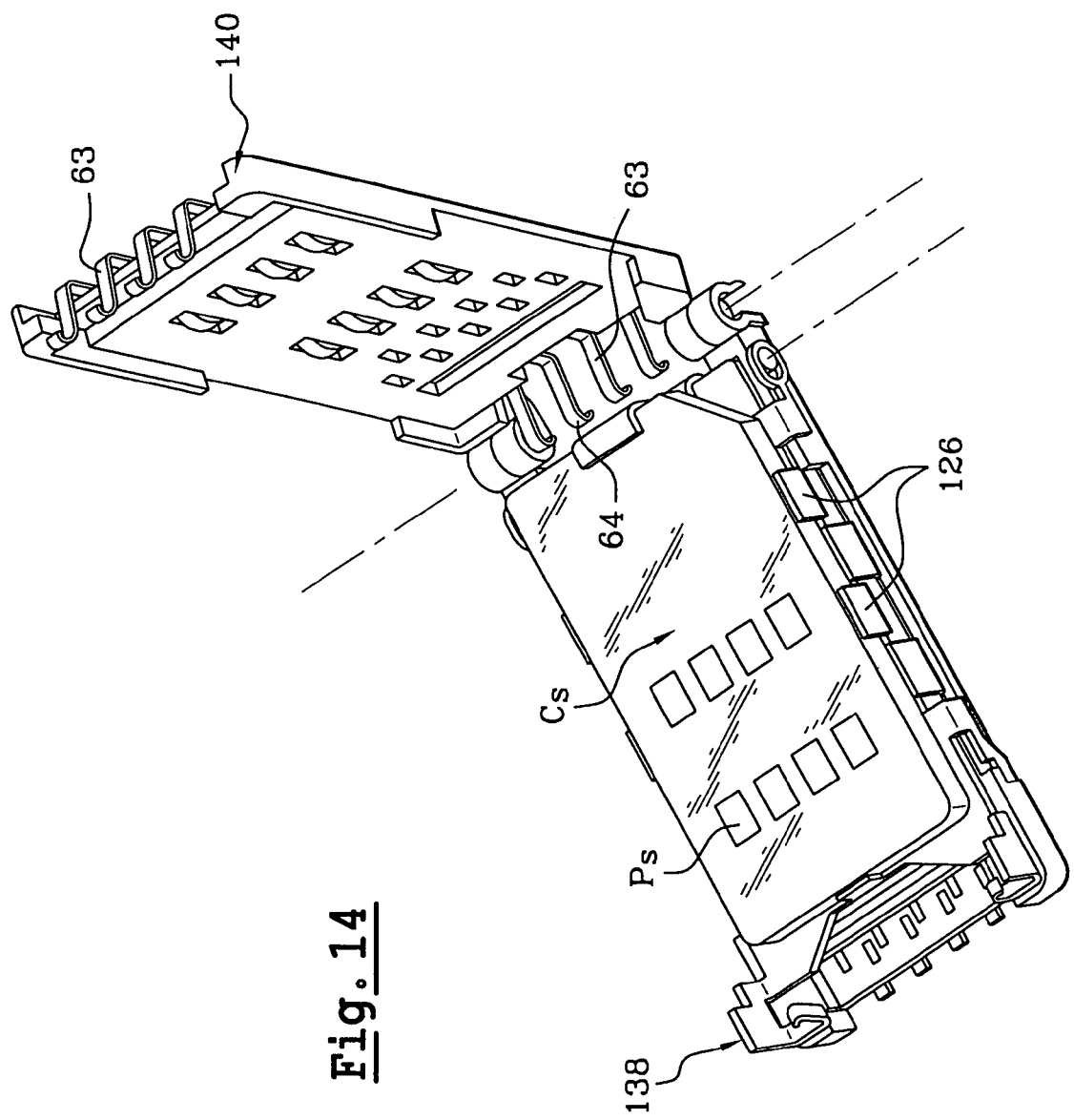
FIG. 14 is a view similar to the previous one, in which the intermediate plate is represented in the lowered horizontal position on the intermediate plate.

The positioning and the retention of the upper card Cs are provided for by a horizontal and forward fold of the rear tab 118 and by a transverse and vertical front tab 119 which runs upwards, as well as by two pairs of lateral guiding tabs 126 which here are not shaped as runners, thereby making it possible to install or extract the upper card Cs by raising it, rather than by sliding it parallel to its plane (FIG. 14).

This operation is especially advantageous when, as in FIG. 14, the intermediate plate 36 is lowered and locked on the base 32, in particular when the front longitudinal end of the connector is surrounded on the printed circuit board by other components which prevent extraction or installation of the card by sliding in a longitudinal and horizontal direction.

The rear longitudinal end 130, 132 of the intermediate plate 36 is here mounted articulated on the base 32 and the articulation pivots 133 are for this purpose made molded with the plate 42 of the base 32. The intermediate plate 36 is thus also mounted slidably on the base 32.

In accordance with a characteristic of this second embodiment, the locking and the unlocking of the intermediate plate 36 with respect to the base 32 and of the cover 34 with respect to the intermediate plate 36 are independent.

Thus, the intermediate plate 36 constitutes a sliding locking element only for locking the intermediate plate 36 with respect to the base 32 on which it is mounted articulated and longitudinally slidably.

The lower locking tabs 134 are of similar design to the previous ones, and in the locked front extreme position, they are received under the lugs 136 of the base 32.

In the unlocked rear position of the intermediate plate 36, it is possible to pivot the assembly consisting of the intermediate plate 36, the upper card Cs if it is present, and the cover 34, so as to access just the lower card Ci or to install such a card under the intermediate plate 36. The means of locking the cover 34 on the intermediate plate 36 consist of upper dogs 138 (FIG. 12) which are each formed at the front free end of an upright 104 of the intermediate plate 36 which in this zone, is thus elastically deformable in the manner of a flexing beam.

Each dog 138 is designed in the form of a runner or passage which, in the locked position as illustrated in FIGS. 16 to 19, receives a corresponding locking lug 140 formed at the front longitudinal end of the cover 34.

As may be seen in particular in FIG. 19, each locking tab 138 is shaped with an engagement ramp 137 which cooperates with the associated lug 140 so as to cause the outward transverse separation of the tabs when the user lowers the cover 34 vertically downwards onto the intermediate plate 36.

On the other hand, to unlock the cover 34 with respect to the intermediate plate 36, the user bears transversely inwards on the external lateral faces 139 of the upper locking dogs or tabs 138.

The cooperation of the rear ends of the uprights 130 with ramps 131 of the base provide an effect of elastic restoring of the intermediate plate 36 longitudinally frontwards into the locked position.

The electrical connection of the contact blades 54 of the cover 34 is here provided for directly with conducting tracks of the printed circuit board which carries the connector.

Figure 15:
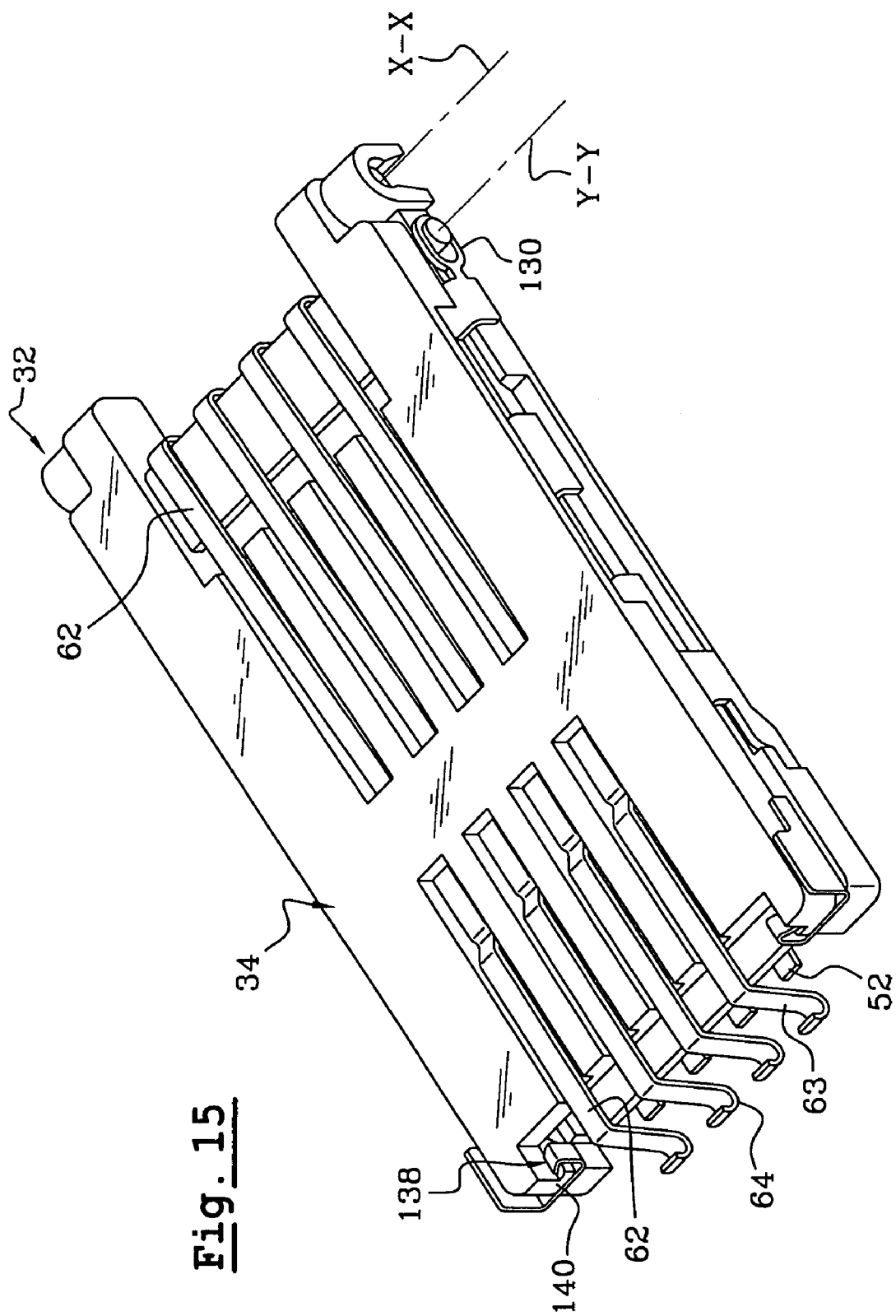
FIG. 15 is a view similar to the previous one in which the connector is represented in the position of use with the upper cover closed and locked on the intermediate plate and on the lower base.

For this purpose, each contact blade 54 comprises a free electrical connection end 62 (15) which runs longitudinally beyond the front and rear corresponding longitudinal beyond the front and rear corresponding longitudinal end of the plate of insulating material 44, then is folded substantially at right angles downwards by a slightly inclined vertical branch 63 and terminates in a cylindrical arc foot 64 which is able to come directly into contact with a conducting track of the printed circuit board when the cover is in its closed and locked position illustrated in FIGS. 15, 17, and 18.

Each foot 64 then bears elastically on the corresponding track, providing for electrical connection contact.

In so far as the connection ends 62, 63, 64 of a pair of longitudinally aligned contact blades 54 run frontwards and rearwards respectively, the loads applied to the connector by the ends 62 are perfectly distributed and balanced, in particular in so far as the bearing points of the feet 64 are located on either side of the tabs 52 for connection of the contact blades of the base 32 and by virtue of which the connector is fixed by soldering to the printed circuit board.

The third embodiment will now be described by comparison and analogy with the two embodiments just described.

Firstly, the intermediate plate 35 is made by molding from a plastic and it is mounted articulated on the base with no possibility of sliding in the longitudinal direction. For this purpose, the ports 130 are replaced with semicylindrical housing 139 open towards the bottom.

The mode of locking is similar to that of the first embodiment in so far as the locking or unlocking of the intermediate plate 36 with respect to the base and of the cover with respect to the intermediate plate 36 are simultaneous.

Figure 21:
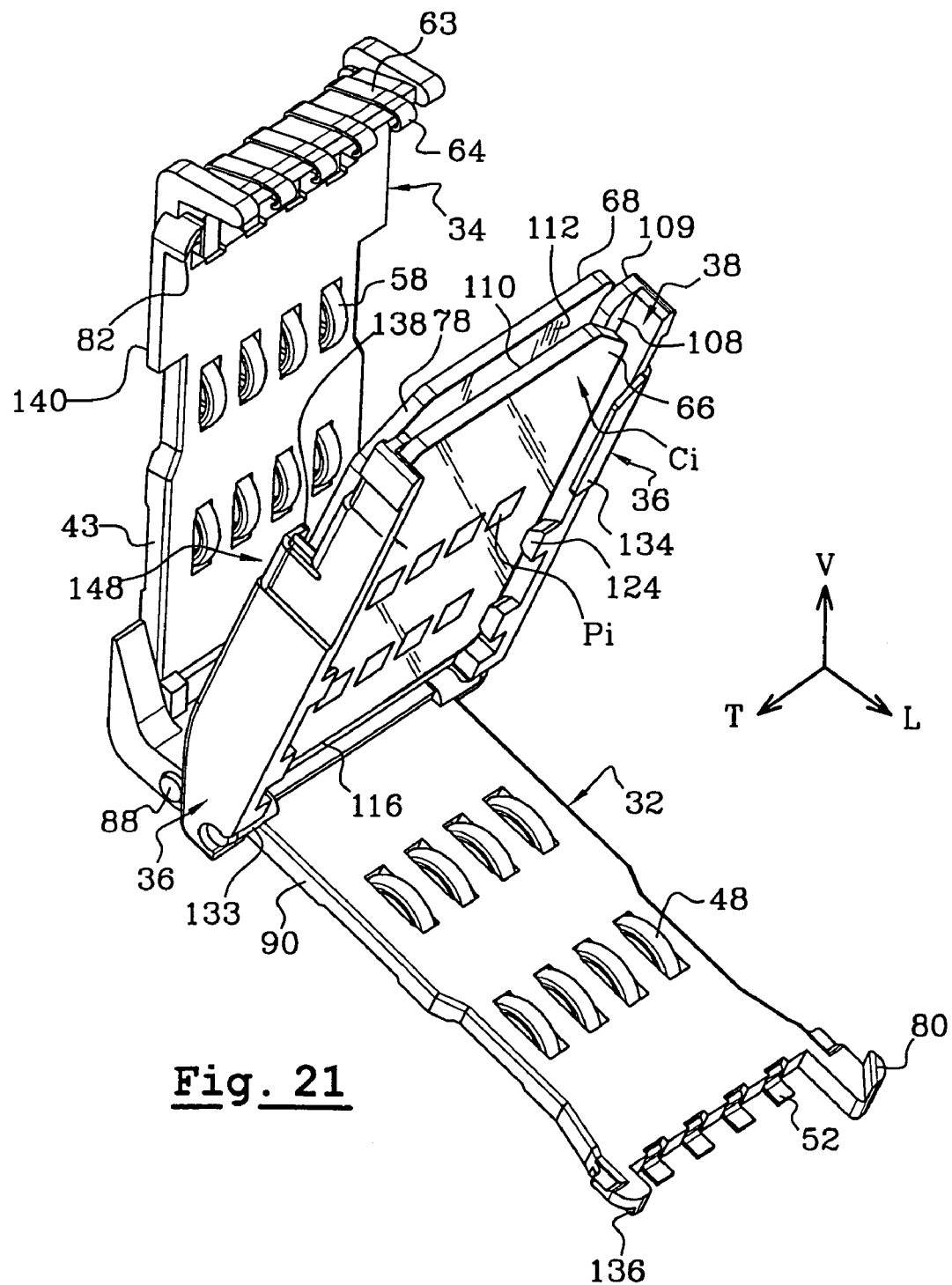
FIG. 21 is an isometric view of a third embodiment of a connector according to the present invention which is represented in the open position with the two cards in place in the card-carrying intermediate plate.
Figure 22:
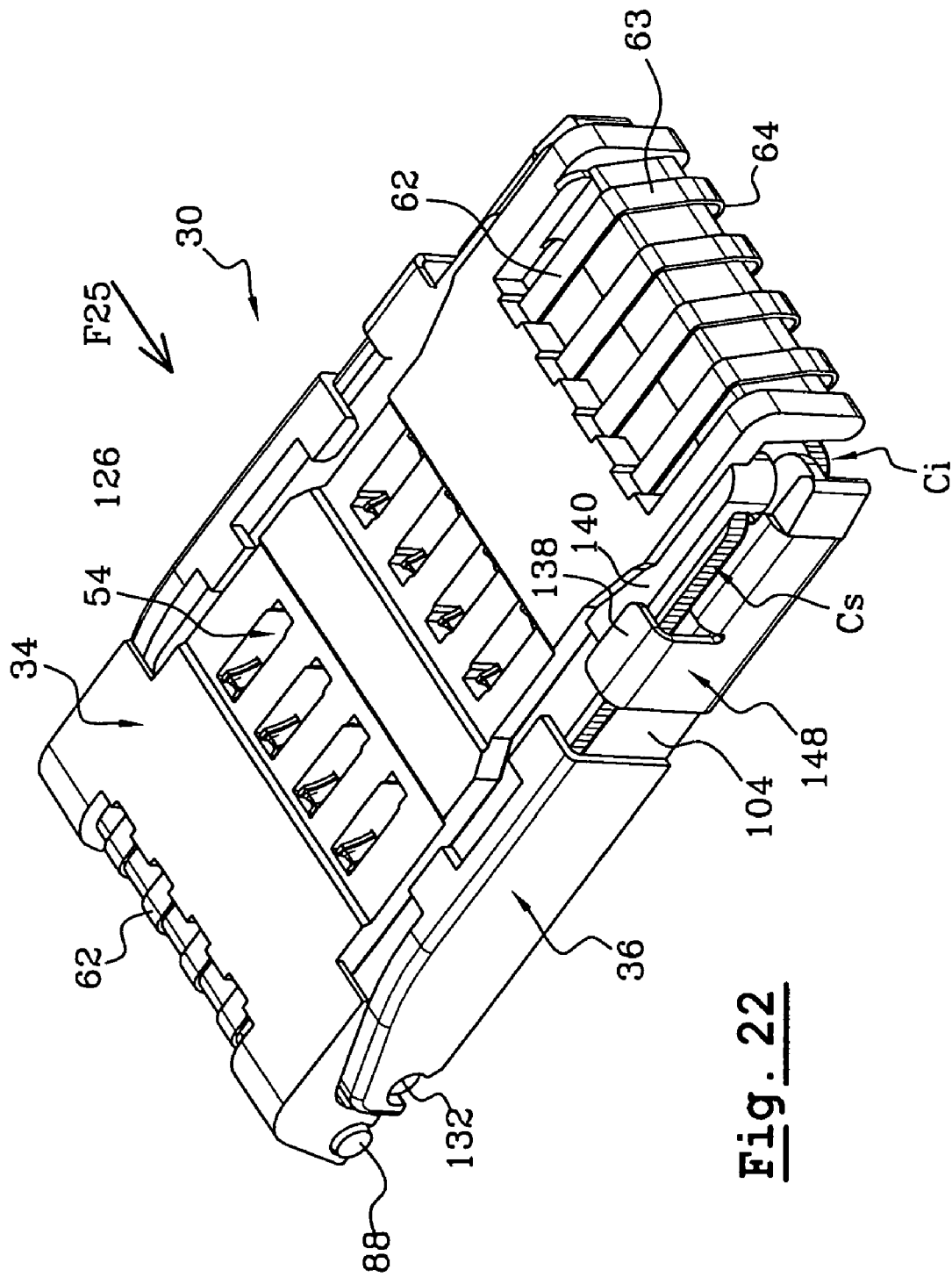
FIG. 22 is an isometric view from above of the connector of the previous figure in which the cover is represented in the closed and locked position.
Figure 23:
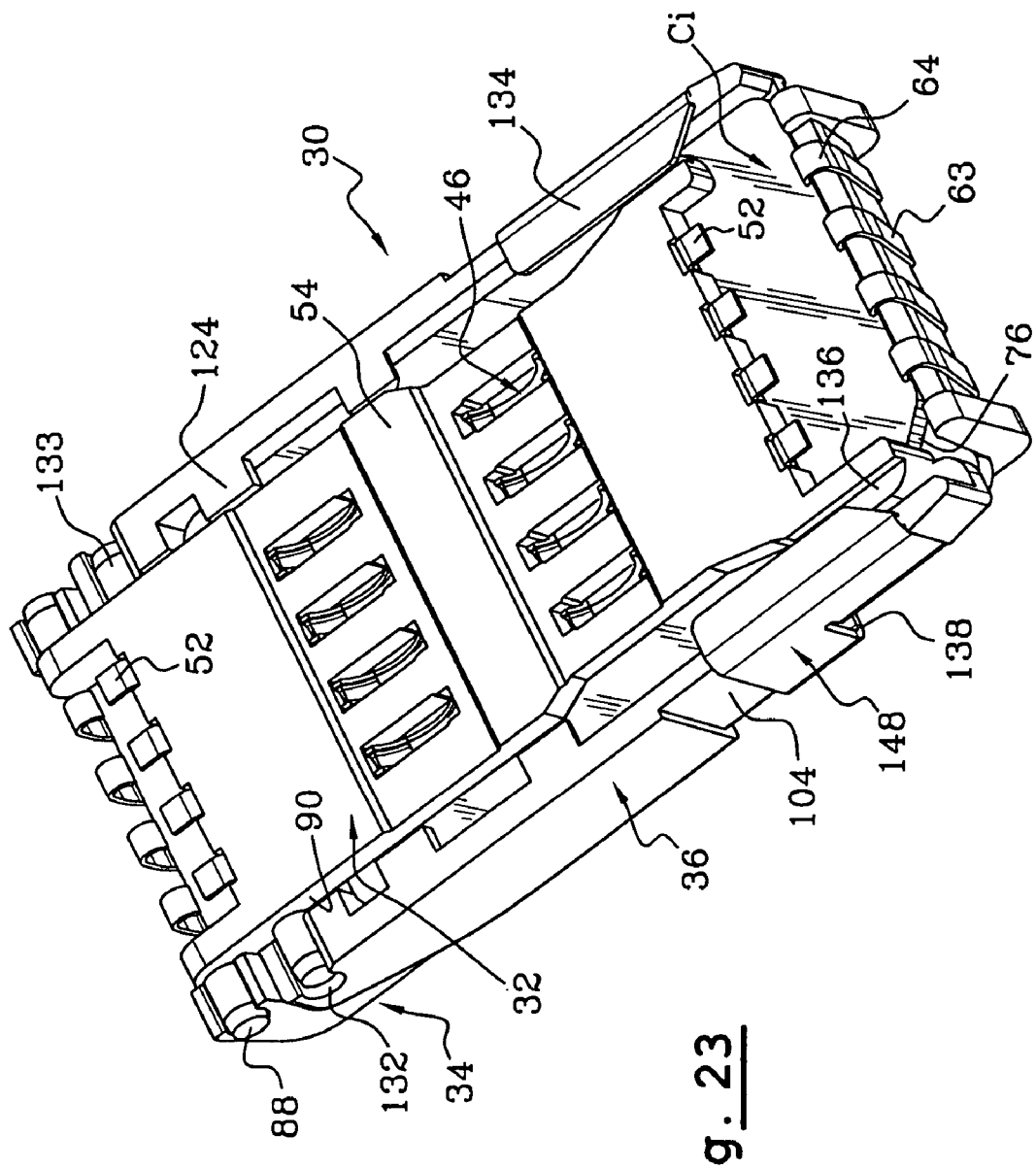
FIG. 23 is an isometric view from below of the connect of the previous figure.
Figure 24:
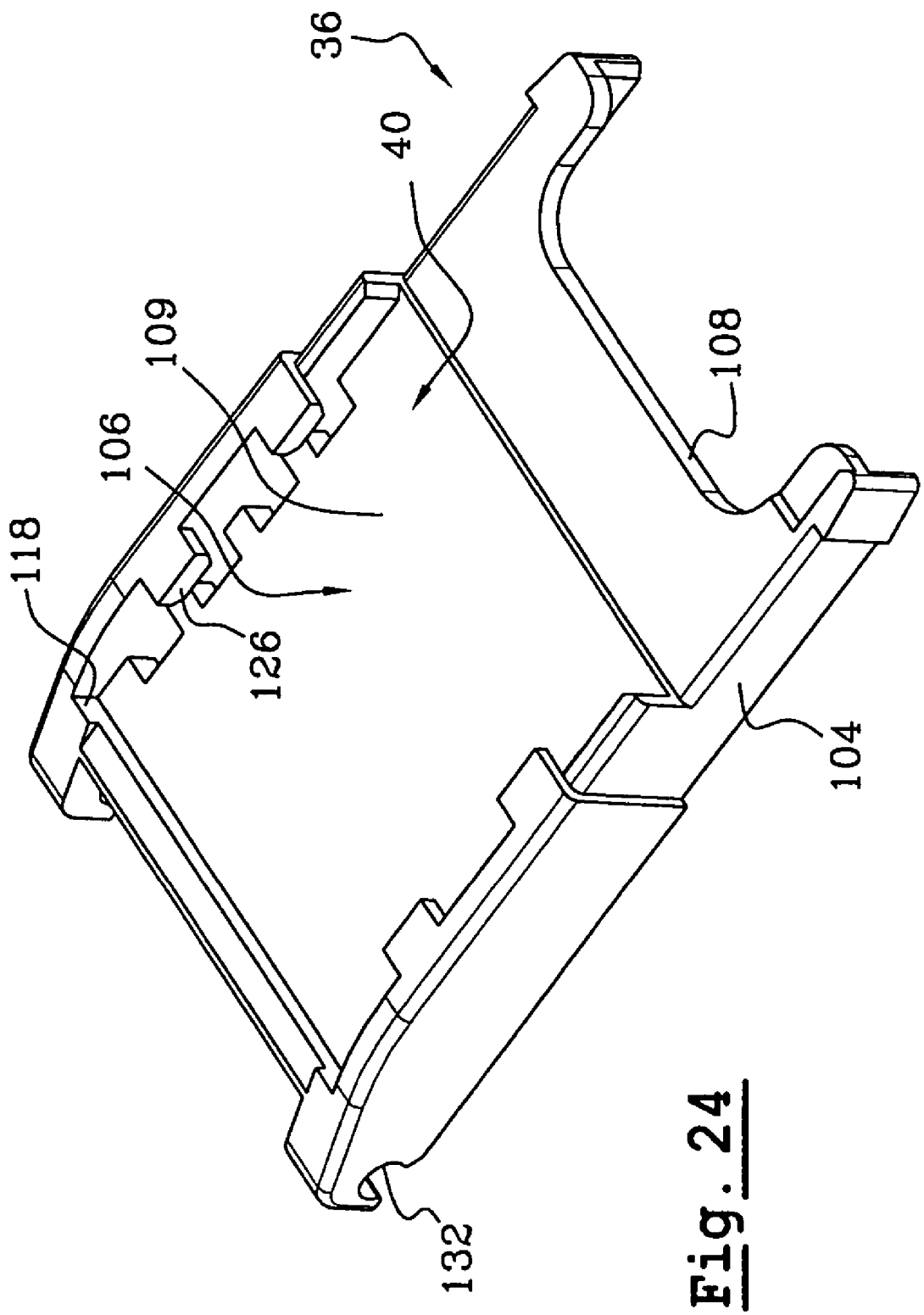
FIG. 24 is an isometric view from above of the card-carrying intermediate plate.
Figure 25:
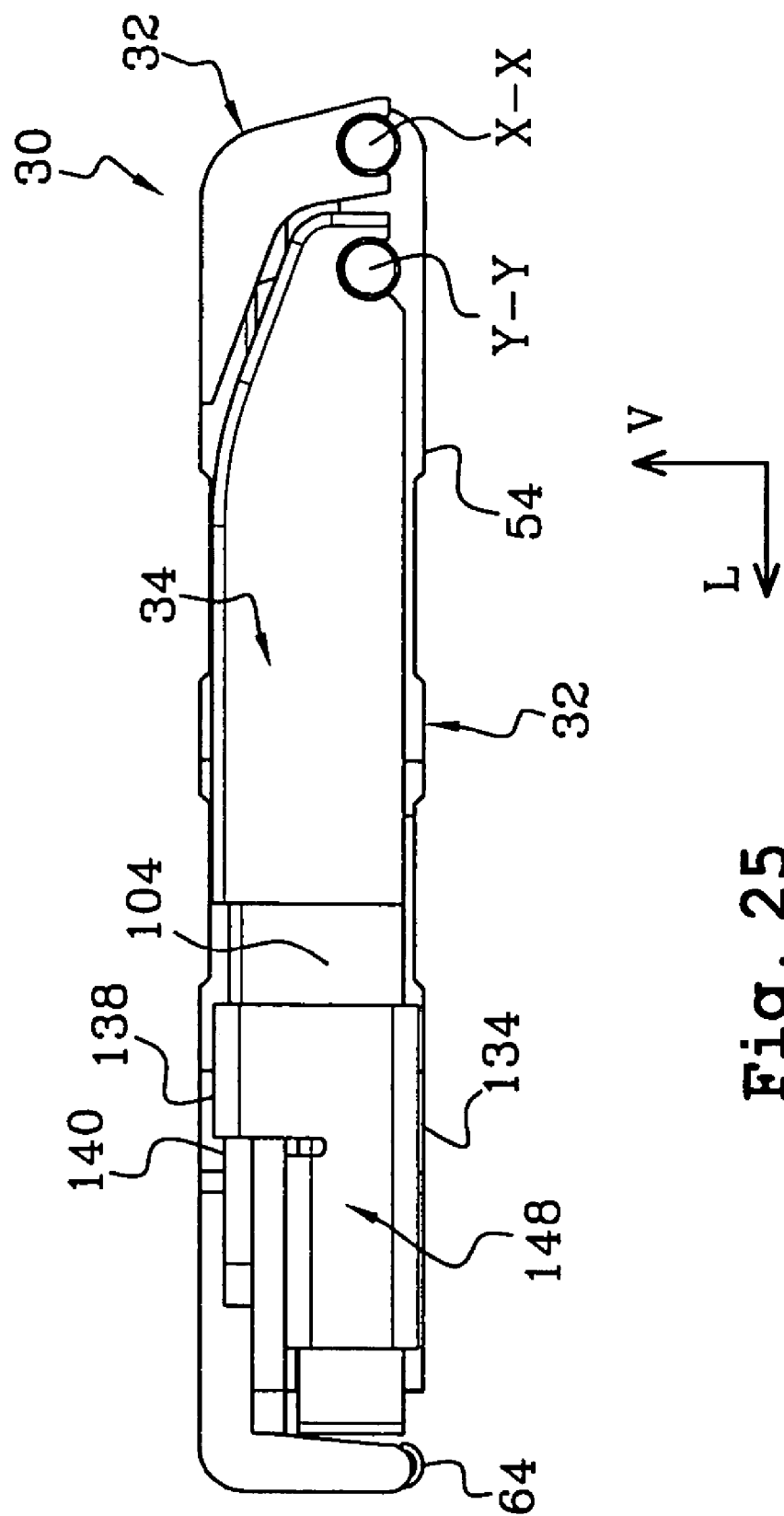
FIG. 25 is a side view of the connector along the arrow F25 of FIG. 22.
Figure 26:
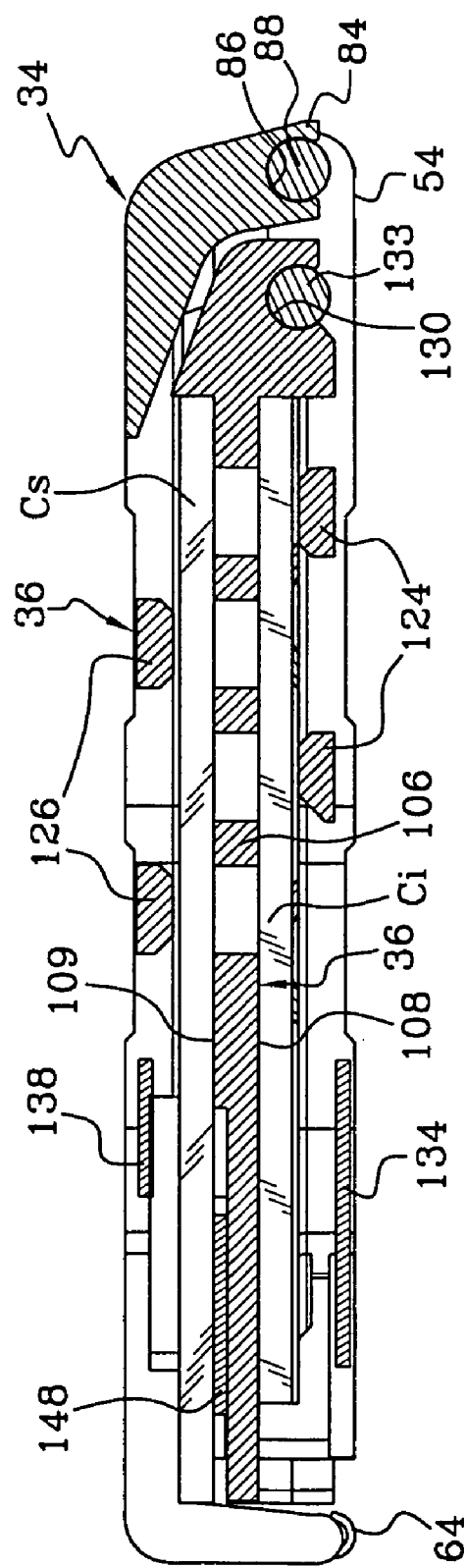
FIG. 26 is a view similar to that of the previous figure and in which the connector is represented in cross section by a vertical plane passing through the zones of articulation and of locking of the connector in the closed position.

The locking element is here an independent lock 148 which is mounted slidably longitudinally on the intermediate plate 35 between an unlocked rear longitudinal position represented in FIG. 21 and a locked front extreme position illustrated in FIGS. 22 to 25.

The lock is a metal item whose design is similar overall to that of the lock of the card-carrying cover of the simple connector described and represented in document WO-A-98/52137.

As may be seen in particular in FIG. 21, the arrangement of the biasing (polarization) fingers 80 and 82 at the front right end of the base 32 and front left end of the cover 34 impose a head-to-tail mounting of ht lower cards Ci and Cs.

The design of the tabs 102 for connection of the contact blades of the cover 34 is similar to that described for the second embodiment.

In all the embodiments, the presence of a metal locking element movable in longitudinal translation with lower locking tabs 135 makes it possible to incorporate into the dual connector according to the invention a switch function for detecting the locked or unlocked position for example according to the design described and represented in the document WO-A-01/08266.

Moreover, the closing or the opening of the cover can on each occasion be detected by the processing circuits of the apparatus which incorporates the connector in the same manner as the presence or the absence of the upper card.

What is claimed is:

1. A smart card connector for connecting to smart cards that have contact pads, comprising a base which includes an insulative base plate and a plurality of base contact blades mounted on the base plate and having contact ends projecting upward from the base plate, and a cover that is pivotally connected to the base about a transverse axis and that includes an insulative cover plate and a plurality of cover contact blades mounted on the cover plate and having contact ends projecting downward from the cover plate, including:
    an intermediate plate device that lies between said base and cover plates and that is at least pivotally connected to one of them about a transverse axis, said intermediate plate having upper and lower intermediate plate faces, said intermediate plate device having card mounts that hold a pair of smart cards with each smart card held against a different one of said intermediate plate faces.

2. The connector described in claim 1, including:
    upper and lower smart cards mounted by one of said card mounts respectively against said upper and lower intermediate plate faces, each of said smart cards being of largely rectangular shape with a canted polarizing corner;
    said connector having a pair of polarizing parts that assure that the cards are oriented so their contact pads face away from said intermediate plate and engage the contact blades on said base and cover.

3. The connector described in claim 1 wherein:
    said cover is pivotally mounted on the base about a first axis (X—X), and said intermediate plate device is pivotally connected to said cover about a second axis (Y—Y) that is parallel to said first axis but that is spaced from said first axis.

4. The connector described in claim 1 wherein said cover is pivotable to a closed position closely spaced from said base, and including a circuit board lying under said base, including:
    a plurality of lower connection blades mounted on said base, each connection blades having a tail connected to a conductive trace on said circuit board, and a contacting end that is exposed to said cover;
    said cover contact blades each have tabs that are positioned to contact said contacting ends of said lower connection blades, at least when said cover is pivoted to said closed position.

5. The connector described in claim 1 wherein:
    said intermediate plate device is pivotally connected to said cover plate about an axis that is spaced from said first transverse axis.

6. The connector described in claim 1 wherein:
    said intermediate plate device is slideable in longitudinal directions (L) that are perpendicular to said transverse axes;
    said base and cover each has lugs, and said intermediate plate has locking tabs that are positioned to move respectively above and below said lugs on said cover and base when said intermediate plate slides in a predetermined one of said longitudinal directions.

7. The connector described in claim 4 wherein:
    said cover has a front end and has a rear end portion pivotally connected to said base about a first transverse axis, said intermediate plate device has a handle that projects forward of said cover front end, said handle being manually moveable forward and rearward to move said intermediate plate device forward and rearward.

8. The connector described in claim 1 wherein:
    said intermediate plate device has transversely opposite sides and front and rear ends, said intermediate plate device having an imaginary middle line (127) lying halfway between said transversely opposite sides, and said plate device having a plate part and having tabs at opposite sides of said plate part, said tabs including upper tabs that have vertical parts extending upward from said plate part and having top parts extending inward toward said middle line, and lower tabs having vertical parts extending downward from said plate part and having lower parts extending inward toward said middle line.

9. The connector described in claim 8 wherein:
    said intermediate plate device is formed of a piece of sheet metal with bent sheet metal parts forming said upper and lower tabs, and with said intermediate plate rear end forming a pair of coupling plates with holes therein, said one of said base and cover plates having a pair of trunnions and said holes in said coupling plates receive said trunnions.

10. A smart card connector for connecting to smart cards that have contact pads, comprising a main part which includes an insulative base member and a plurality of contact blades mounted on the base member and having upwardly projecting contact ends, including:
    a second member that lies above said base member and that is at least pivotally coupled about a first axis to said main part to pivot between raised and lowered positions, said second member having lower mounts for mounting one of said cards on a lower surface or said second member;
    said main part having a pair of trunnions lying on said first axis and said second member has a pair of coupling plates with elongated slots that each receive one of said trunnions to allow said second member to slide in first and second directions as well as pivot about said first axis;
    said main part and said second members having locking parts that lock said second member in said lowered position when said lowered second member is slid in said second direction, and that unlock said second member so it can move up when said lowered second member is slid in said first direction;
    said main part includes a cover pivotally connected to said insulative base member, said cover having an insulative cover member and a plurality of contact blades mounted on the insulative cover member and having downwardly projecting contact ends;
    said second member lies between said insulative base member and said insulative cover member, and said second member has upper mounts for mounting one of said cards on an upper surface of said second member.

11. A smart card connector for mounting on a circuit board and for connecting to smart cards that have contact pads, comprising a base which includes an insulative base plate and a plurality of base contact blades mounted on the base plate and having contact ends projecting upward from the base plate, and a cover that is pivotally connected to the base about a first transverse axis and that includes an insulative cover plate and a plurality of cover contact blades mounted on the cover plate and having contact ends projecting downward from the cover plate, said cover being pivotable between upper and lower positions, including:

a plurality of lower connection blades mounted on said base and having tails positioned to connect to said circuit board and contacting ends exposed to said cover;

said cover contact blades each has a tab positioned to engage the contacting end of one of said lower connection blades when said cover lies in said lowered position:

said contact ends of said base contact blades and said tabs of said cover contact blades, are both located at a second end of said base that is opposite said first transverse axis when said cover lies in said lowered position.

12. The connector described in claim 11, including:

an intermediate plate device that lies between said base and cover plates and that is at least pivotally connected to one of them about a second transverse axis, said intermediate plate having upper and lower intermediate plate faces, said intermediate plate device having card mounts that hold a pair of smart cards with each smart card held against a different one of said intermediate plate faces.

13. A method for connecting two smart cards that each have contact pads, to contact blades of a connector, where the connector has a base and has a cover lying over the base and moveable down and up, toward and away from the base, the base and cover having contacts with pad-engaging parts facing respectively upward and downward, including:

positioning first and second smart cards against lower and upper faces of an intermediate plate device that lies between said base and cover, with contact pads of said first and second smart cards facing respectively downward and upward;

moving said cover and intermediate plate device downward so said first and second cards press against said pad-engaging parts of said base and cover contacts;

said intermediate plate device is pivotally coupled to said cover and to said base, and said intermediate plate device is slideable in forward and rearward directions with respect to said cover and base;

said cover and base have latches, and said intermediate plate device has locks that engage said latches to hold said intermediate plate device and cover in downward positions when the intermediate plate device is slid in a forward direction.

* * * * *